Feb. 5, 1952          J. BAILEY          2,584,827
CROSSOVER HOMOGENIZING APPARATUS
Filed March 7, 1947
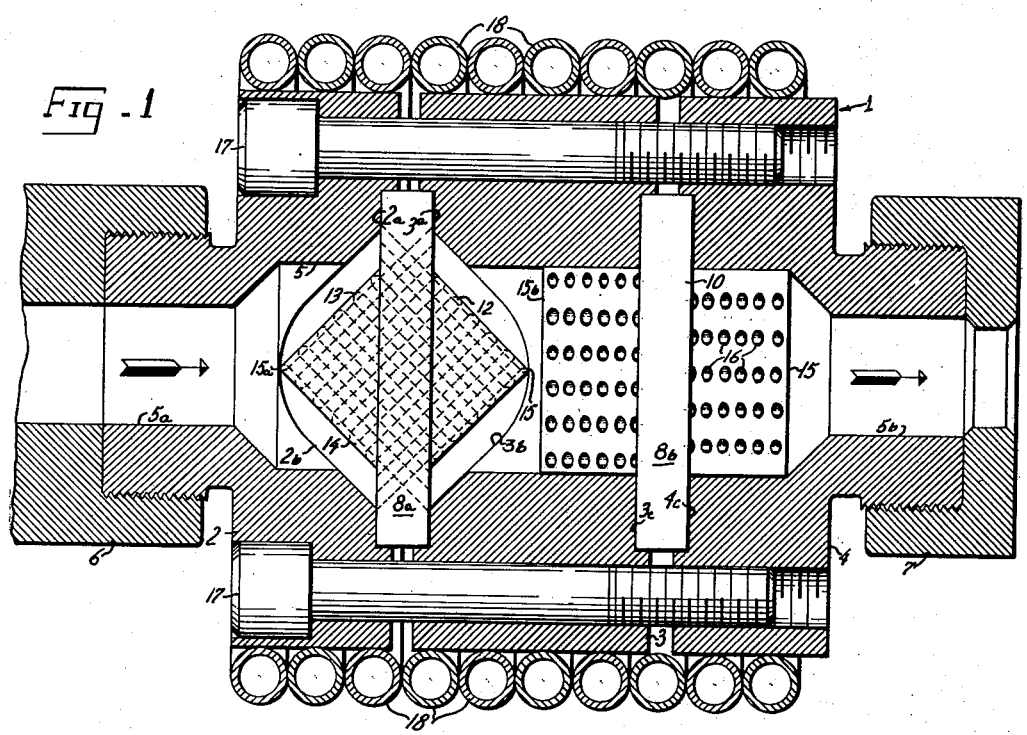
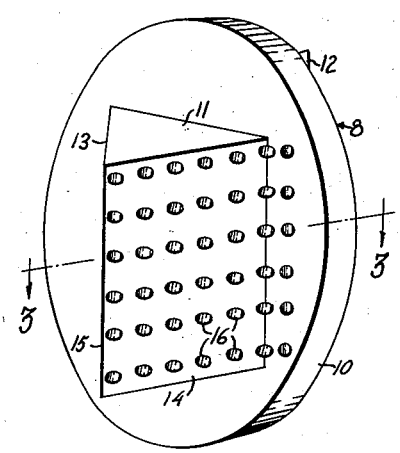
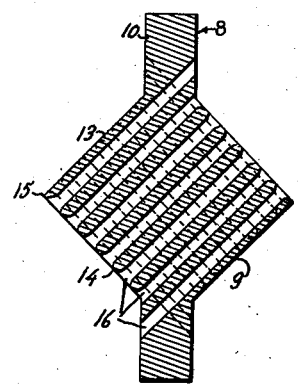
INVENTOR
JAMES BAILEY
BY *Parham & Bates*
ATTORNEYS Patented Feb. 5, 1952

2,584,827

UNITED STATES PATENT OFFICE 2,584,827

CROSSOVER HOMOGENIZING APPARATUS

James Bailey, West Hartford, Conn., assignor to Plax Corporation, Hartford, Conn., a corporation of Delaware Application March 7, 1947, Serial No. 733,170

5 Claims. (Cl. 259—4)

The present invention relates generally to the manufacture of plastic articles, and has for a principal object the provision of novel appartus by means of which a confined stream of more or less heterogeneous plastic material may be thoroughly mixed before the material is shaped to a desired permanent form as, for example, by extrusion through a die in the form of rod or tubing.

Apparatus embodying the invention operates to finely divide and thereafter reunite a stream in a novel manner characterized by the fact that the reunited stream is turned inside-out and outside-in and rendered considerably more homogeneous than the original.

One embodiment of the invention is illustrated in the attached drawings, in which:

Fig. 1 is a cross-sectional elevation of an homogenizer including a pair of members oriented relative to each other for receiving a stream of plastic, as from an extruder, and successively dividing, distributing and reuniting the stream prior to delivering it to a forming die;

Fig. 2 is a perspective view of one of the pair of dividing and distributing members shown in Fig. 1; and Fig. 3 is a cross-sectional view taken through line 3—3 of Fig. 2 of the novel dividing and distributing member.

Referring more particularly to the drawings, there is illustrated an homogenizer including a three-part housing, indicated generally by the numeral 1, the components of which are designated by the numerals 2, 3 and 4. The housing 1 is generally cylindrical in shape and defines a continuous cylindrical bore 5 which is connected in a plastic supply line intermediate an extruder 6 and a forming die 7 as by means of threaded couplings. Only the outlet end of the extruder 6 is illustrated in the drawings, it being understood that the details of the extruder are not material to the invention and that a variety of commercial models may be employed to supply a plastic stream through the homogenizer to the die 7. Likewise, the type of die employed may vary, the one shown being merely illustrative of a forming member or die generally. Plastic from the extruder 6 is received by a smaller diameter upstream portion 5a of the main bore 5 and channeled through the larger main bore 5 and then through a smaller downstream bore 5b to the forming die 7.

Disposed in the passageway 5 are a pair of like dividing and distributing elements which, while identical in structure and identified, generally, by the common numeral 8, are, for more ready reference, distinguished in Fig. 1 of the drawings by differentiating reference letters, the upstream element being identified as 8a and the downstream element as 8b. Inasmuch as the construction of the two elements are identical, their several component portions are identified hereinafter by the same numerals, distinguishing letters being added in those instances where, for clarity, it is desirable to distinguish between like portions of the two elements.

Referring more particularly to the construction of the like elements 8a and 8b, each comprises a steel member having a generally cubical body portion 9 and an integral circular supporting frame portion 10 which divides the body portion 9 along a diagonal so that like wedge shaped portions 11 and 12 are located on opposite sides of frame 10. Each wedge includes a pair of plastic distributing surfaces 13 and 14 which are disposed at 45° angles to the support 11 and at 90° to each other, and which intersect to form a plastic separating or dividing edge generally designated by the numeral 15. When assembled in the homogenizer, the circular support 10 of the upstream die member 8a is secured between the opposing surfaces of the members 2 and 3 which are cylindrically recessed at 2a and 3a so as to center the circular member 10 relative to the cylindrical bore 5. The members 2 and 3 are also milled at 2b and 3b so as to receive, respectively, the identical upstream and downstream wedge portions 11 and 12 of the distributing member 8a.

Similarly, the cylindrical support 10 of the downstream dividing and distributing member 8b is centered and secured within the cylindrical recesses 3c and 4c which are formed in the adjacent surfaces of the housing components 3 and 4. In addition, the housing components 3 and 4 are suitably milled to receive the upstream and downstream wedge portions 11 and 12 of the downstream distributing member 8b.

As shown in Fig. 1, the housing component 3 receives and orients the upstream wedge portion 11 of member 8b at 90° to the downstream wedge portion 12 of the upstream distributing member 8a located in the milled recess 3b. Thus, where the upstream dividing edge 15a of the wedge 8a is disposed transversely of the bore 5 along a horizontal diameter, the corresponding upsteam dividing edge 15b of the downstream distributing member 8b is disposed transversely of the bore 5 along a vertical diameter.

As illustrated in the drawings, a series of distributor ducts or channels 16 extend through each distributing member 8. The channels 16 are arranged in spaced planes which are both parallel and normal to the surfaces 13 and 14. More particularly, the series of channels are alternately staggered so that at one level, parallel, equally-spaced channels 16 extend through the distributing member 8 normal to the surface 13 and parallel to the surface 14, and the next spaced series of channels extend through member 8, normal to the surface 14, and parallel to the surface 13.

The location of these channels is best described by the manner in which they function. Plastic material, which is forced in a continuous stream by the extruder 6 into the homogenizer inlet 5a, is divided by the edge 15a of the upstream dividing member 8a into like upper and lower components in the bore 5. The upper component, in part, slides along the distributing surface 13, a portion, at least, being forced through the channels or ducts 16 nearest the dividing edge 15a. Those channels receive plastic from the center of the stream and direct it to the outer wall or confines of the passageway 5 downstream of the distributing member. Whereas, plastic from the zone intermediate the dividing edge 15a and the upper wall of the bore 5 is received, at least in part, by the ducts located centrally of the wall 13 and is distributed downstream to points intermediate the center line and the lower wall of the bore 5. Finally, the plastic flowing along the upper wall of the bore 5, and that portion which slides along the wall 13 and does not enter the intermediate ducts, enters the series of ducts, which are parallel to and most remote from wall 14, and is discharged downstream adjacent to and just beneath the center of the bore 5.

Similarly, the ducts 16, which open into the lower dividing face 14, transpose, at least in part, the components of the lower half of the stream of plastic relative to the center line and lower wall of the bore 5 and discharge the plastic downstream in the transposed order in the upper portion of the bore 5.

The ducts 16 in the upstream dividing member 8a thus act to at least partially transpose the components of the upper and lower portions divided from the main stream by the upstream dividing edge 15a. At the same time, the central portion of the main stream is distributed, at least in part, to the outside of the stream and the outside of the main stream is distributed, at least in part, to the center of the duct 5. Thus, when the several components of the plastic stream are reunited at the downstream side of the dividing member 8a, the stream, at least in part, has been turned inside-out and outside-in, as well as up-portion-down and down-portion-up, with respect to dividing edge 15a.

It will be understood that plastic, upon reaching a dividing wall surface 13 or 14, is not all immediately received by the nearest channel 16 inlet, and that portions of the stream slide along the walls 13 and 14 and are received by channel openings located nearer the outer confines of the bore 5 and downstream of the point where the plastic originally reached the surfaces 13 and 14.

The reunited stream of plastic material intermediate the distributing members 8a and 8b, is again turned inside-out by the member 8b and, further, transposed about a vertical rather than a horizontal axis. In this connection, the vertically disposed dividing edge 15b and the directing walls 13 and 14 act to divide the reunited stream into equal fore and aft components and the distributing channels 16 act to transpose the plastic material hind-side-to in the reunited stream which is delivered by the homogenizer outlet 5b to the die or forming member 7.

It will be seen that the present invention acts to receive and thoroughly mix a stream of plastic and to discharge it in a more thoroughly homogeneous condition than that in which it may have been received. The stream, at least in part, in turned up-side-down, and hind-side-to, as well as inside-out.

The embodiment of the invention illustrated is readily assembled and disassembled, a single set of bolts 17 being sufficient to hold the several parts 2, 3 and 4 of the housing together with the distributing members 8a and 8b properly located in assembled position.

Where thermo-plastics are passed through the homogenizer, the temperature may be readily controlled by means of a heating coil 18 located about the periphery of the housing.

For best results, care should be taken, as by locating upstream channel openings or inlets at the outer confines of the bore 5 and by beveling all openings, so that there are no dead spots against which plastic may lodge.

Having thus described the invention, I claim:

1. Apparatus for continuously mixing the material constituting a confined plastic stream flowing continuously under pressure including a housing for laterally confining the flow of plastic material therethrough, a first distributing member for dividing the stream along a first line through approximately its center into two substantially equal parts, a plurality of channels in said distributing member for directing plastic from one side of the dividing line to the other into a reunited stream in the housing, a second distributing member for redividing the stream along a second line through approximately the center of said reunited stream into substantially equal parts, said first and second dividing lines being at approximately right angles to the stream and to each other, and a plurality of channels in said distributing member for directing plastic from each part of the redivided stream from one side of the second dividing line to the other into a reunited stream.

2. Apparatus for mixing plastic material including a housing for laterally confining the flow of plastic material therethrough, a first distributing member for dividing the stream along a first longitudinal plane therethrough, a plurality of channels in said distributing member for directing material from one side of said plane to the other into a reunited stream in the housing, a second distributing member for redividing the stream along a second longitudinal plane, said first and second longitudinal planes being angularly disposed to each other, and a plurality of channels in said second distributing member for directing material from each part of the redivided stream from one side of the second plane to the other into a reunited stream.

3. Apparatus for mixing plastic material including a housing for laterally confining the flow of a stream of plastic material therethrough, means for forcing the plastic stream through the housing under pressure, a first distributing member for dividing the stream along a first line through approximately its center into two substantially equal parts, a plurality of channels in said distributing member for directing portions from one side of the dividing line to the other into a reunited stream within the housing, a second distributing member for redividing the stream along a second line through approximately the center of said reunited stream into substantially equal parts, said first and second dividing lines being at approximately right angles to the stream and to each other, and a plurality of channels in said second distributing member for directing portions from each part of the redivided stream from one side of the second dividing line to the other into a reunited stream.

4. Apparatus for mixing plastic material including a housing for laterally confining the flow of a stream of plastic material therethrough, a first distributing member in side housing for dividing the stream along a first line through approximately its center into two substantially equal parts, two sets of parallel channels in said distributing member, each set being angularly disposed to the other and to the stream of plastic material, for directing portions from one side of the dividing line to the other into a reunited stream in the housing, a second distributing member for redividing the stream along a second line through approximately the center of said reunited stream into substantially equal parts, said first and second dividing lines being at approximately right angles to the stream and to each other, and two sets of parallel channels in said second distributing member disposed substantially as in said first member for directing portions from each part of the redivided stream from one side of the second dividing line to the other into a reunited stream.

5. Apparatus for continuously mixing plastic material including a housing for laterally confining the flow of a stream of plastic material therethrough, a first distributing member for dividing the stream along a first line through approximately its center into two substantially equal parts, distributing surfaces angularly disposed to each other and to the direction of flow of the stream for directing outwardly the parts of said stream from said first dividing line, a plurality of channels extending through said distributing member from said surfaces for directing material from one side of the dividing line to the other into a reunited stream in the housing, a second distributing member for redividing the stream along a second line through approximately the center of said reunited stream into substantially equal parts, said first and second dividing lines being at approximately right angles to the stream and to each other, distributing surfaces angularly disposed to each other and to the direction of flow of the stream for directing outwardly the parts of said stream from said second dividing line, and a plurality of channels extending through said second distributing member from the distributing surfaces thereof for directing material from each part of the redivided stream from one side of the second dividing line to the other into a reunited stream.

JAMES BAILEY.

REFERENCES CITED

The following references are of record in the file of this patent:

UNITED STATES PATENTS

| Number | Name | Date |
|---|---|---|
| 161,708 | Schafhaus | Apr. 6, 1875 |
| 1,626,487 | Warren | Apr. 26, 1927 |
| 2,284,255 | Baureschmidt | May 26, 1942 |

FOREIGN PATENTS

| Number | Country | Date |
|---|---|---|
| 209,826 | Germany | June 4, 1907 |
| 735,033 | France | Nov. 2, 1932 |